United States Patent
Björklund et al.

(10) Patent No.: US 9,952,672 B2
(45) Date of Patent: Apr. 24, 2018

(54) ARRANGEMENT, METHOD AND COMPUTER PROGRAM FOR CONTROLLING A COMPUTER APPARATUS BASED ON EYE-TRACKING

(71) Applicant: Tobii AB, Danderyd (SE)

(72) Inventors: Christoffer Björklund, Stockholm (SE); Henrik Eskilsson, Danderyd (SE); Magnus Jacobson, Sundbyberg (SE); Mårten Skogö, Bromma (SE)

(73) Assignee: Tobii AB, Danderyd (SE)

( * ) Notice: Subject to any disclaimer, the term of this patent is extended or adjusted under 35 U.S.C. 154(b) by 656 days.

(21) Appl. No.: 13/960,476

(22) Filed: Aug. 6, 2013

(65) Prior Publication Data
US 2014/0009390 A1    Jan. 9, 2014

Related U.S. Application Data

(63) Continuation of application No. 13/335,502, filed on Dec. 22, 2011, which is a continuation of application
(Continued)

(30) Foreign Application Priority Data

Jun. 18, 2004 (EP) ..................................... 04445071

(51) Int. Cl.
G06F 3/01    (2006.01)
(52) U.S. Cl.
CPC .............. G06F 3/017 (2013.01); G06F 3/013 (2013.01)
(58) Field of Classification Search
CPC ................................. G06F 3/013; G06F 3/017
See application file for complete search history.

(56) References Cited

U.S. PATENT DOCUMENTS 5,360,971 A    11/1994    Kaufman et al.
5,649,061 A    7/1997    Smyth
(Continued)

FOREIGN PATENT DOCUMENTS

EP    0651544 A2    5/1995

OTHER PUBLICATIONS

Robert J. K. Jacob, Eye tracking in advanced interface design, Virtual environments and advanced interface design, Oxford University Press, Inc., New York, NY, 1995.*
International Search Report for PCT/SE2005/000775, dated Aug. 23, 2005.
David Geary "An inside view of Observer" Mar. 28, 2003 Java World, Inc. 13 pages.
(Continued)

*Primary Examiner* — Andrea Long
(74) *Attorney, Agent, or Firm* — Kilpatrick Townsend & Stockton LLP

(57) ABSTRACT

A computer apparatus is associated with a graphical display presenting at least one GUI-component adapted to be manipulated based on user-generated commands. An event engine is adapted to receive an eye-tracking data signal that describes a user's point of regard on the display. Based on the signal, the event engine produces a set of non-cursor controlling event output signals, which influence the at least one GUI-component. Each non-cursor controlling event output signal describes a particular aspect of the user's ocular activity in respect of the display. Initially, the event engine receives a control signal request from each of the at least one GUI-component. The control signal request defines a sub-set of the set of non-cursor controlling event output signals which is required by the particular GUI-component. The event engine delivers non-cursor controlling event output signals to the at least one GUI-component in accordance with each respective control signal request.

17 Claims, 4 Drawing Sheets

Related U.S. Application Data

No. 11/570,840, filed as application No. PCT/SE2005/000775 on May 24, 2005, now Pat. No. 8,185,845.

(56) References Cited

U.S. PATENT DOCUMENTS

| | | | |
|---|---|---|---|
| 5,850,211 | A | 12/1998 | Tognazzini |
| 6,152,563 | A * | 11/2000 | Hutchinson ............ A61B 3/113 351/209 |
| 6,204,828 | B1 | 3/2001 | Amir et al. |
| 6,323,884 | B1 | 11/2001 | Bird et al. |
| 6,351,273 | B1 * | 2/2002 | Lemelson ............ G06F 3/0485 704/271 |
| 6,456,262 | B1 | 9/2002 | Bell |
| 6,478,425 | B2 | 11/2002 | Trajkovic et al. |
| 6,526,159 | B1 | 2/2003 | Nickerson |
| 6,577,329 | B1 | 6/2003 | Flickner et al. |
| 6,643,721 | B1 | 11/2003 | Sun |
| 6,909,439 | B1 * | 6/2005 | Amro .................. G06F 3/04855 345/660 |
| 2002/0070965 | A1 | 6/2002 | Austin |
| 2002/0070966 | A1 | 6/2002 | Austin |
| 2002/0070968 | A1 | 6/2002 | Austin et al. |
| 2004/0001100 | A1 | 1/2004 | Wajda |
| 2005/0047629 | A1 | 3/2005 | Farrell et al. |

OTHER PUBLICATIONS

Eugster, P. T., Felber, P. A., Guerraoui, R., and Kermarrec, A. 2003. The many faces of publish/subscribe. ACM Comput.Surv.35, 2 (Jun. 2003), 114-131.

Gamma et al., "Design Patterns: Elements of Reusable Object-Oriented-Software," Observer, Addison-Wesley Professional Computing Series, 1994, pp. 293-303, XP002382762.

Jacob, "A Specification Language for Direct-Manipulation User Interfaces," ACM Transactions on Graphics, vol. 5, No. 4, Oct. 1986, pp. 283-317.

Jacob, "Eye tracking in Advanced Interface Design," Virtual Environments and Advanced Interface Design, (Editors' Barfield et al.), Oxford University Press, Chapter 7, 1995, pp. 258-288.

Paivi Majaranta, Anne Aula, and Kari0Jouko Raiha Effects of Feedback on Eye Typing with a Shorth Dwell Time 2004 ACM pp. 139-146.

Siewiorek, D.; Smailagic, A.; Hornyak, M.; , "Multimodal contextual car-driver interface," Multimodal Interfaces, 2002. Proceedings. Fourth IEEE International Conference on , vol., No., pp. 367-373, 2002.

Weiner et al., "Fundamentals of OOP and Data Structures in Java," Cambridge University Press, Chapters 5 and 6, 2000, pp. 77-118.

Zhai, Shumin What's in the Eyes for Attentive Input Mar. 2003 vol. 46, No. 3 Communications of the ACM.

* cited by examiner

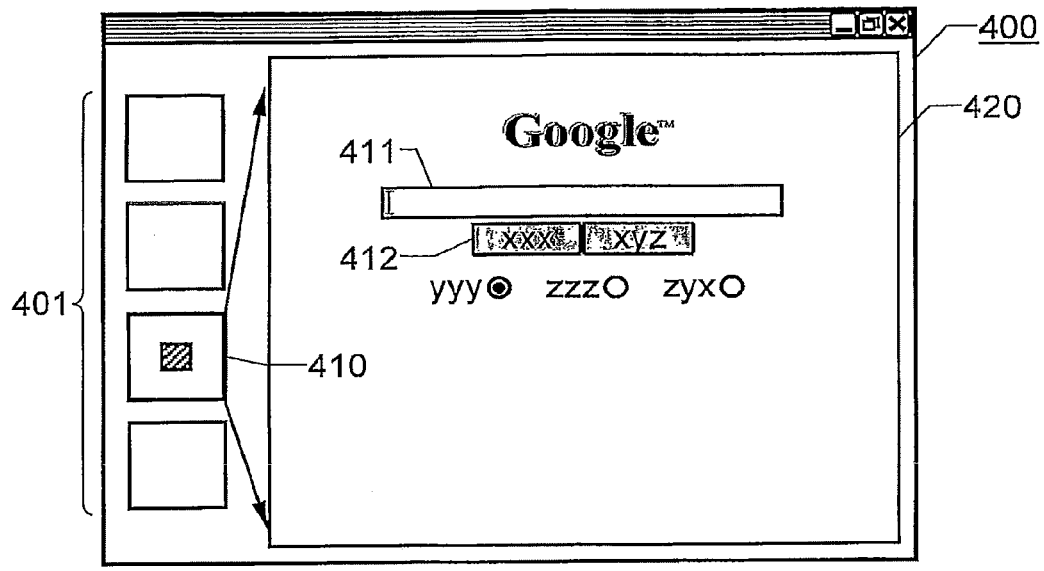
Fig. 3a  Fig. 3b
Fig. 4
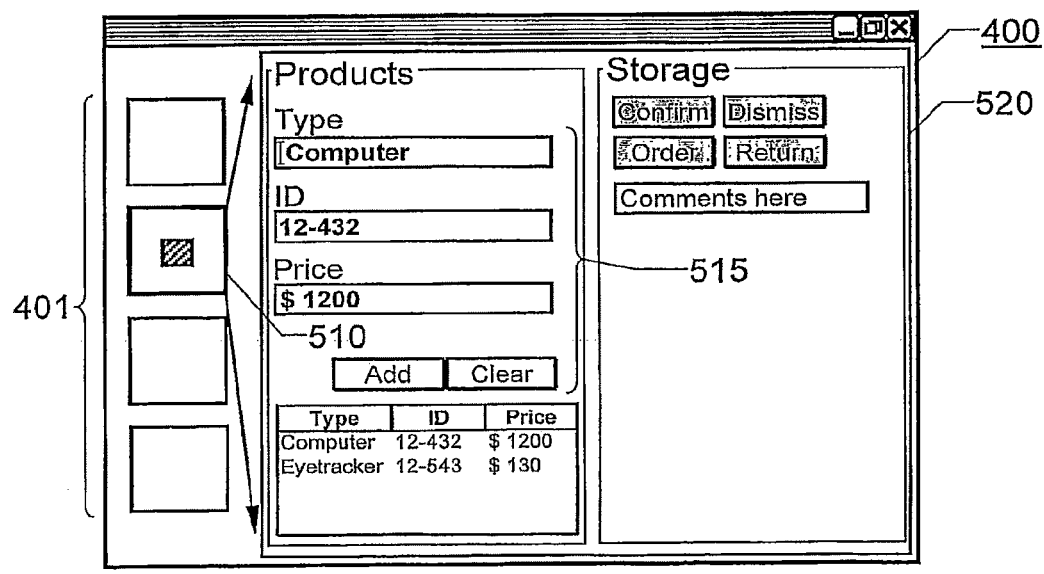
Fig. 5

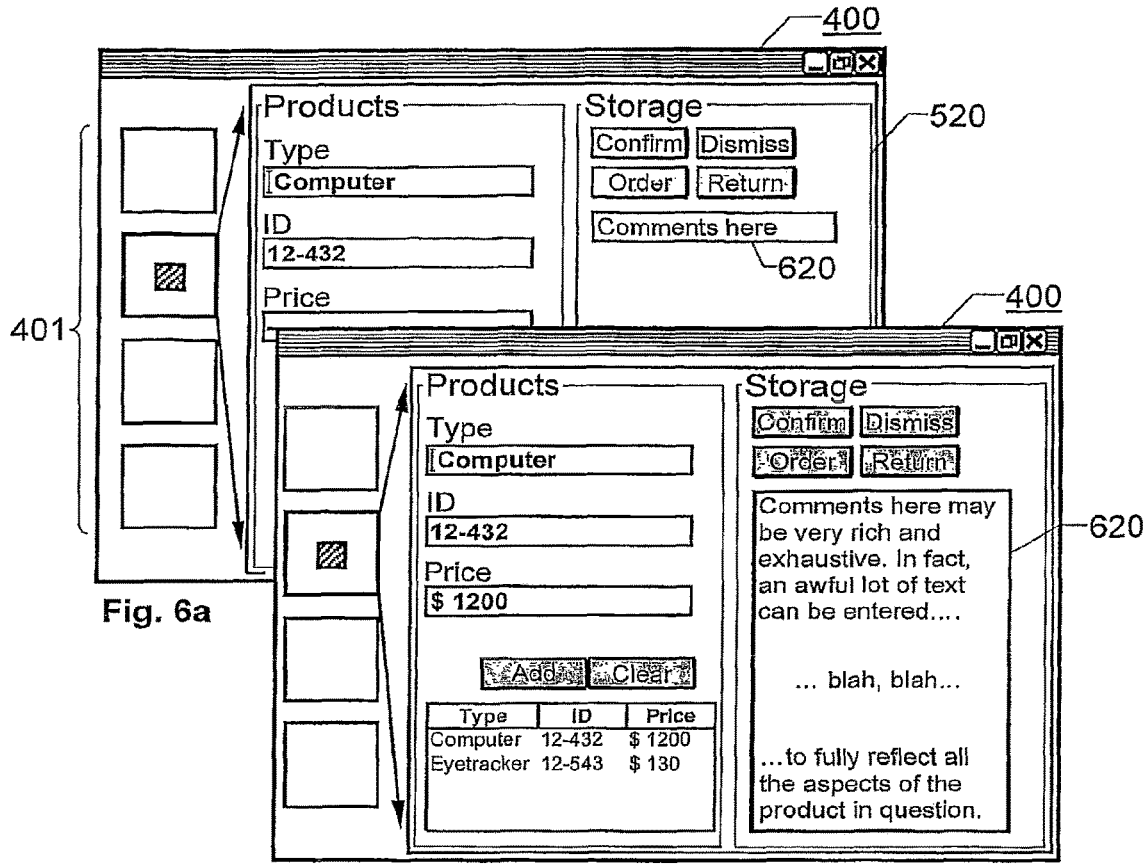
Fig. 6a
Fig. 6b
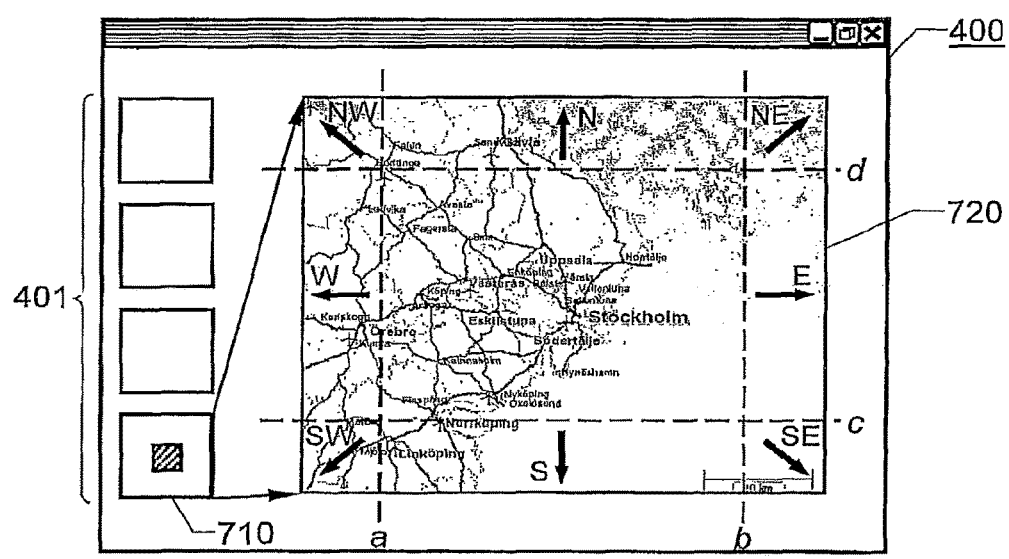
Fig. 7

ARRANGEMENT, METHOD AND COMPUTER PROGRAM FOR CONTROLLING A COMPUTER APPARATUS BASED ON EYE-TRACKING

CROSS-REFERENCE TO RELATED APPLICATIONS

This application is a Continuation of co-pending U.S. patent application Ser. No. 13/335,502 filed on Dec. 22, 2011, which is a Continuation of U.S. patent application Ser. No. 11/570,840 filed on Dec. 18, 2006, now U.S. Pat. No. 8,185,845, which is the national phase of PCT International Application No. PCT/SE2005/000775 filed on May 24, 2005, which claims priority to European Patent Application No. 04445071.6 filed on Jun. 18, 2004. The entire contents of all of the above applications are hereby incorporated by reference.

THE BACKGROUND OF THE INVENTION

Field of the Invention

The present invention relates generally to computer based eye-tracking systems. More particularly the invention relates to an arrangement for controlling a computer apparatus according to the preamble of claim 1 and a corresponding method according to the preamble of claim 11. The invention also relates to a computer program according to claim 21 and a computer readable medium according to claim 22.

Description of Related Art

The human computer interaction was revolutionized by the introduction of the graphical user interface (GUI). Namely, thereby, an efficient means was provided for presenting information to a user with a bandwidth which immensely exceeded any prior channels. Over the years the speed at which information can be presented has increased further through color screens, enlarged displays, intelligent graphical objects (e.g. pop-up windows), window tabs, menus, toolbars and sounds. During this time, however, the input devices have remained essentially unchanged, i.e. the keyboard and the pointing device (e.g. mouse, track ball or touch pad). In recent years, handwriting devices have been introduced (e.g. in the form of a stylus or graphical pen). Nevertheless, while the output bandwidth has multiplied several times, the input ditto has been substantially unaltered. Consequently, a severe. asymmetry in the communication bandwidth in the human computer interaction has occurred.

In order to decrease this bandwidth gap, various attempts have been made to use eye-tracking devices. However, in many cases these devices miss the mark in one or several respects. One problem is that the prior-art solutions fail to take a holistic view on the input interfaces to the computer. Thereby, comparatively heavy motor tasks may be imposed on the eyes, which in fact are strictly perceptive organs. Typically, this leads to fatigue symptoms and a degree of discomfort experienced by the user. This is particularly true if an eye tracker is used to control a cursor on a graphical display, and for various reasons the eye tracker fails to track the user's point of regard sufficiently well, so that there is a mismatch between the user's actual point of regard and the position against which the cursor is controlled.

Instead of controlling the cursor directly, an eye gaze signal may be used to select an appropriate initial cursor position. The document U.S. Pat. No. 6,204,828 discloses an integrated gaze/manual cursor positioning system, which aids an operator to position a cursor by integrating an eye-gaze signal and a manual input. When a mechanical activation of an operator device is detected the cursor is placed at an initial position which is predetermined with respect to the operator's current gaze area. Thus, a user friendly cursor function is accomplished.

The document U.S. Pat. No. 6,401,050 describes a visual interaction system for a shipboard watch station. Here, an eye-tracking camera monitors an operator's visual scan, gaze location, dwell time, blink rate and pupil size to determine whether additional cueing of the operator should be made to direct the operator's attention to an important object on the screen.

The document U.S. Pat. No. 5,649,061 discloses a device for estimating a mental decision to select a visual cue from a viewer's eye fixation and corresponding event evoked cerebral potential. An eye tracker registers a viewing direction, and based thereon fixation properties may be determined in terms of duration, start and end pupil sizes, saccades and blinks. A corresponding single event evoked cerebral potential is extracted, and an artificial neural network estimates a selection interest in the gaze point of regard. After training the artificial neural network, the device may then be used to control a computer, such that icons on a display are activated according to a user's estimated intentions without requiring any manipulation by means of the user's hands.

A few attempts have also been made to abstract user-generated input data into high-level information for controlling a computer. For example, the document US 2004/0001100 describes a multimode user interface, where a flexible processing of a user input is made possible without having to switch manually between different input modes. Instead, within the data streams different information categories are distinguished depending on a context in which the data streams are generated.

Although this strategy may indeed enhance the efficiency of the man-machine interaction, no multimodal solution has yet been presented according to which eye-tracking data is processed optimally. On the contrary, with only very few exceptions, today's eye tracking interfaces are each tailored for one specific task only. Thus, any processing of eye tracking data in respect of a first application cannot be reused by a second application, and vice versa. Hence, if multiple eye-controlled applications are used in a single computer, one particular eye-tracking data processing unit is typically required for each application. Naturally, in such a case, there is a high risk that the different applications perform a substantial amount of overlapping eye-tracking data processing. Moreover, each designer of eye-controllable applications needs to have expertise in both eye tracking technology and the interpretation of eye-tracking data in order to extract the data required by the application.

SUMMARY OF THE INVENTION

The object of the present invention is therefore to provide a holistic means of controlling a computer apparatus based on a user's ocular activity, which alleviates the above problems and thus offers an efficient man-machine interaction with a minimal amount of double processing, i.e. wherein as much as possible of the eye-tracking data processing is performed centrally in respect of GUI-components that may belong to two or more separate applications.

According to one aspect of the invention, the object is achieved by the arrangement as initially described, wherein the event engine is adapted to receive a control signal request from each of the at least one GUI-component. The control signal request defines a sub-set of the set of non-cursor controlling event output signals, which is required by the GUI-component in question. The event engine is also adapted to deliver non-cursor controlling event output signals to the at least one GUI-component in accordance with each respective control signal request.

This arrangement is advantageous because thereby a very flexible interface is attained towards any applications which are controllable by means of eye tracking signals. This, in turn, enables software developers without an in-depth knowledge of eye-tracking technology to design eye-controllable applications. Therefore, the invention is believed to stimulate the development of new such applications, and consequently render further improvements of the human computer interaction possible. Moreover, the computer's processing resources are freed for alternative purposes, since a high-level eye-tracking data signal derived in respect of one application may be reused by one or more additional applications. In other words, the event engine is adapted to perform a centralized eye-tracking data processing for GUI-components (or potential "subscribers") on-demand. Thus, each of these components and their requested control signals need not be explicitly known at the point in time when the event engine is implemented. Instead, according to the invention, one or more GUI-components may request relevant control signals in connection with the implementation of a later added eye-controllable application. Of course, the opposite may also be true, namely that a set of control signal requests is presented once and for all at start-up of the proposed arrangement.

According to a preferred embodiment of this aspect of the invention, the computer apparatus is also adapted to receive a cursor control signal, and in response to the cursor control signal, control a graphical pointer on the display. Thus, for instance, the event engine and the cursor control signal may interact jointly with GUI-components represented on the display, such that a very intuitive man-machine interaction is accomplished.

According to another preferred embodiment of this aspect of the invention, at least one GUI-component is adapted to generate at least one respective output control signal upon a user manipulation of the component. This means that by manipulating a GUI-component, the user may cause the computer apparatus to generate outgoing signals to one or more external units, such as a printer, a camera etc. Naturally, this is a highly desirable feature. Moreover, the fact that one or more GUI-components may generate an output control signal does not preclude that with respect to one or more other GUI-components, the non-cursor controlling event output signals may exclusively affect the component internally.

According to a preferred embodiment of this aspect of the invention, the event engine is adapted to produce at least a first signal of the non-cursor controlling event output signals based on a dynamic development of the eye-tracking data signal. Thereby, a time parameter of the user's ocular activity may be used to control functions and processes of the computer apparatus. For instance, the time parameter may reflect a dwell time of the user's gaze within a particular region on the display, identify a certain gaze pattern etc. Many types of advanced eye-controllable functions can thereby be realized.

According to yet another preferred embodiment of this aspect of the invention, at least one GUI-component is adapted to interpret a non-cursor controlling event output signal as a representation of the user's intention. In response to this estimated intention, a user manipulation of the component is triggered. For example this may involve activating one or more computer functions based on a command history. This is advantageous because thereby the command input procedure may be simplified.

According to still another preferred embodiment of this aspect of the invention, at least one GUI-component is adapted to interpret a non-cursor controlling event output signal as an estimated attention level of the user. In response to this estimated attention level, a user manipulation of the component is triggered. One advantage attainable thereby is that the computer's behavior may be adapted to match a current attention level of the user.

According to yet another preferred embodiment of this aspect of the invention, at least one GUI-component is adapted to interpret a non-cursor controlling event signal as a state-of-mind parameter of the user, and in response thereto trigger a user manipulation of the component. This feature is desirable because it allows the computer to behave differently depending on whether the user appears to be focused/concentrated, distracted, tired/unfocused or confused etc.

According to still another preferred embodiment of this aspect of the invention, the event engine is adapted to receive at least one auxiliary input signal, such as a signal from a button or a switch, a speech signal, a movement pattern of an input member, a camera registered gesture pattern or facial expression, or an EEG (electroencephalogram)-signal. On the further basis of this auxiliary signal the event engine produces the set of non-cursor controlling event output signals. Thereby, a highly efficient combination of user input signals may be used to control the computer. Generally, these combinations can be made very intuitive and easy to learn.

According to another aspect of the invention the object is achieved by the method as initially described, wherein a control signal request is received from each of the at least one GUI-component. The control signal request defines a sub-set of the set of non-cursor controlling event output signals, which is required by the particular GUI-component. Non-cursor controlling event output signals are then delivered to the at least one GUI-component in accordance with each respective control signal request.

The advantages of this method, as well as the preferred embodiments thereof, are apparent from the discussion hereinabove with reference to the proposed arrangement.

According to a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above proposed method.

The invention dramatically increases the available bandwidth for transferring information from a user to a computer apparatus, i.e. essentially generating commands, however not necessarily perceived as such by the user. Therefore, this increase of the bandwidth places no additional cognitive workload on the user.

On the contrary, by means of the invention, the cognitive workload may, in fact, be reduced. At the same time, the increased bandwidth vouches for an improved efficiency of the man-machine interaction.

Moreover, by means of the invention, commands which traditionally have required hand and/or finger manipulations, can be efficiently and effortlessly effected based on the user's eye activity. Naturally, this is desirable in a broad range of applications, from disabled computer users, support operators in a call-center environment (e.g. when entering/editing data in a customer relationship management application), users of advanced computer aided design (CAD) tools, surgeons, to drivers and pilots who, for various reasons, cannot effectively produce hand- and/or finger-based commands. Even in situations where the users have their hands and fingers readily accessible, the invention may be useful to improve the ergonomics and the reduce risk of e.g. repetitive strain injuries. Alternatively, the environment in which the computer apparatus is placed may be so clean or dirty that either the environment has to be protected from possible emissions from the computer apparatus, or reverse this apparatus must be protected against hazardous substances in the environment and therefore has to be encapsulated to such a degree that a traditional entry of input of commands is made impossible, or at least impractical.

The invention offers an excellent basis for developing new software and computer applications, which are controllable by the eyes of a user. Thereby, in the long term, the invention vouches for a deep and unconstrained integration of eye interaction applications into the standard computer environment.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

FIGS. 3a-b show proposed symbols representing an eye-controllable GUI-component on a display in a non-observed and an observed mode respectively;

FIG. 4 illustrates a first embodiment according to the invention, where a proposed multiview toolbar is used;

FIG. 5 illustrates a second embodiment according to the invention based on the proposed multiview toolbar;

FIGS. 6a-b illustrate a third embodiment according to the invention, where screen controls are adapted to expand upon a manipulation, which is based on a user's ocular activity;

FIG. 7 illustrates a fourth embodiment according to the invention, which realizes a scrolling function based on a user's ocular activity.

DESCRIPTION OF PREFERRED
EMBODIMENTS OF THE INVENTION

Figure 1:
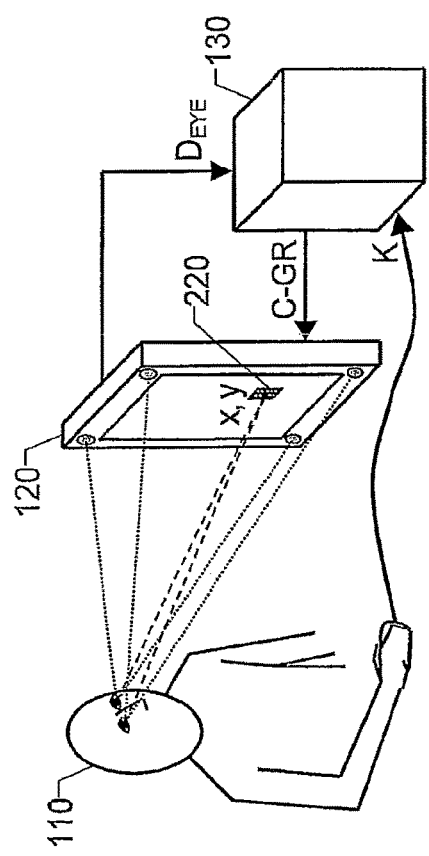
FIG. 1 shows an overview picture of a user controlling a computer apparatus according to the invention.

FIG. 1 shows an overview picture of a typical use-case according to the invention. Here, a user 110 controls a computer apparatus 130, at least partly based on an eye-tracking data signal $D_{EYE}$, which describes the user's 110 point of regard x, y on a display 120. Thus, by watching a representation of a GUI-component 220 on the display 120, the user 110 may generate commands to the computer apparatus 130. This manipulation is enabled, since the GUI-component 220 is adapted to be, at least indirectly, influenced by the eye-tracking data signal $D_{EYE}$. The invention presumes that the eye-tracking data signal $D_{EYE}$ may result in events, related to any task performable by the computer apparatus, apart from affecting a cursor/pointer on the display 120. It should be noted that according to the invention, any type of known computer screen or monitor, as well as combinations of two or more separate displays may represent the display 120. For example, the display 120 may constitute a pair of stereoscopic screens, a heads-up display (HUD), a head-mounted display (HMD) and a presentation means for a virtual environment, such as the eyepieces of a pair of 3D-glasses or a room where the walls include projection screens for presenting a virtual environment.

Naturally, in order to produce the eye-tracking data signal $D_{EYE}$, the display 120 is associated with, or includes, an eye-tracker. This unit is not a subject of the present patent application, and therefore will not be described in detail here. However, the eye-tracker is preferably embodied by the solution described in the Swedish patent application 0203457-7, filed on 21 Nov. 2002 in the name of the applicant.

Preferably, a graphics control signal C-GR is generated by the computer apparatus 130 to accomplish visual feedback information on the display 120. The visual feedback information is generated in response to any user commands received by the computer apparatus 130, so as to confirm to the user 110 any commands, which are based on the eye-tracking data signal $D_{EYE}$. Such a confirmation is especially desirable when the commands are produced by means of perceptive organs, for example the human eyes.

According to a preferred embodiment of the invention, besides the eye-tracking data signal $D_{EYE}$, the computer apparatus 130 is adapted to receive a cursor control signal K, which controls the position of a graphical pointer on the display 120. Of course, the graphics control signal C-GR may be based also on the cursor control signal K.

Figure 2:
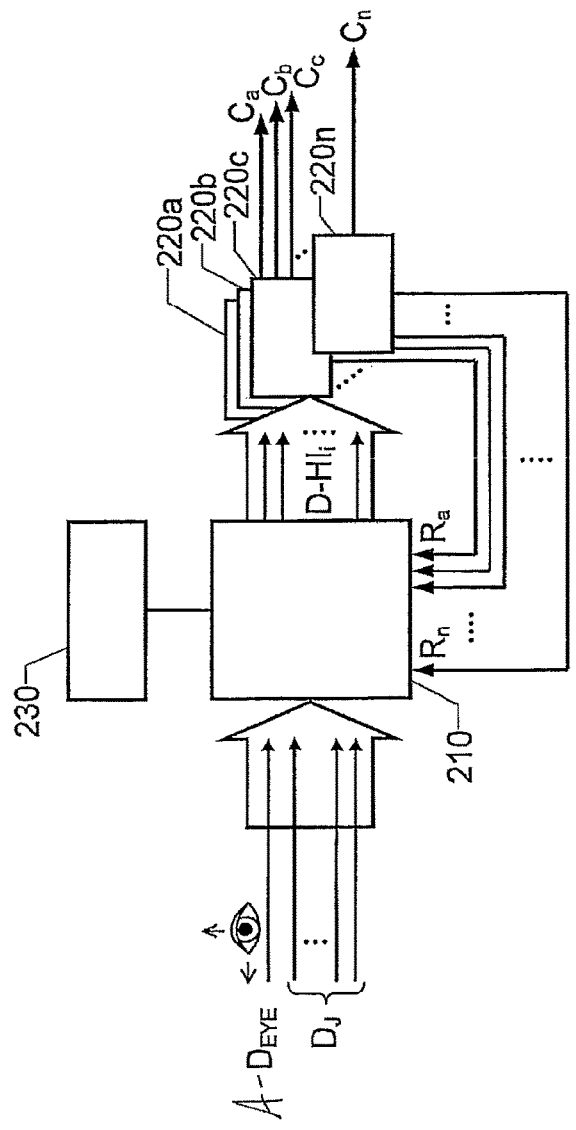
FIG. 2 shows an arrangement for controlling a computer apparatus according to an embodiment of the invention.

FIG. 2 shows an arrangement according to an embodiment of the invention, which may be realized by means of the computer apparatus 130 described above with reference to the FIG. 1.

The arrangement includes an event engine 210 and at least one GUI-component 220, which is adapted to be manipulated based on user-generated commands, at least partly expressed by the eye-tracking data signal $D_{EYE}$. The event engine 210 is adapted to receive the eye-tracking data signal $D_{EYE}$, and based thereon produce a set of non-cursor controlling event output signals D-HIi that influence the at least one GUI-component 220. Each non-cursor controlling event output signal D-HIi, in turn, describes a particular aspect of the user's 110 ocular activity in respect of the display 120.

For example, a first signal may indicate whether the user's 110 gaze is directed towards the display at all (i.e. a "gaze-on-display" signal), a second non-cursor controlling event output signal may reflect a dwell time of the user's 110 gaze within a certain area on the display 120, a third signal may designate a gaze fixation (at a specific point), a fourth signal may indicate whether the gaze saccades, a fifth signal may indicate whether the gaze follows a smooth path, a sixth signal may reflect that the user 110 reads a text, and a seventh signal may be triggered if the user 110 appears to be distracted, based on the particular eye-tracking data signal $D_{EYE}$ that he/she produces.

According to the invention, the event engine 210 receives a respective control signal request Ra, . . . , Rn from each of the at least one GUI-component 220a, . . . , 220n. The control signal request, say Ra, defines a sub-set of the set of non-cursor controlling event output signals D-HIi which are required by the particular GUI-component, say 220a, to operate as intended. The event engine 210 then delivers non-cursor controlling event output signals D-HIi to each of the at least one GUI-component 220a, 220n in accordance with the respective control signal request Ra, . . . , Rn.

A most efficient processing is accomplished if the event engine 210 exclusively produces those event output signals D-HIi which are actually requested by at least one GUI-component. However, according to the invention, it is also conceivable that all non-cursor controlling event output signals D-HIi that are possible to produce are always generated by the event engine 210, irrespective of whether a corresponding control signal request has been received or not. Namely, this simplifies the procedure, and depending on the application, this strategy may not require an overly extensive processing.

According to a preferred embodiment of the invention, each GUI-component 220a, . . . , 220n is adapted to generate at least one respective output control signal Ca, . . . , Ca upon a user manipulation of the component 220a, . . . , 220n. Thus, in addition to generating the above-mentioned visual feedback information, one or more internal or peripheral devices may be influenced by means of the output control signals Ca, . . . , Ca. For example a print job may be initiated, a computing task may be executed, an e-mail may be sent out, a camera may be triggered to take a picture etc.

As mentioned above, the non-cursor controlling event output signals D-HIi may describe many different aspects of the eye-tracking data signal $D_{EYE}$. According to one embodiment of the invention, at least one output signal D-HIi is based on a dynamic development of the eye-tracking data signal $D_{EYE}$. Thereby, the signal can represent a particular gaze pattern over the display 120. The gaze pattern, in turn, may be determined, for instance to constitute saccades, a smooth pursuit, periods of fixation or reading.

A non-cursor controlling event output signal D-HIi may also indicate gaze-enter/gaze-leave data. This data is a parameter which reflects the time instances when the eye-tracking data signal $D_{EYE}$ indicates that the user's point of regard falls within a GUI component's representation on the display. Hence, the gaze-enter data is generated when the user's gaze falls onto a GUI component's representation on the display, and the gaze-leave data is generated when the gaze is directed outside this representation.

The above-mentioned dwell time for a GUI-component is typically defined as the period between the gaze-enter data and the gaze-leave data with respect to a particular GUI component. It is normally preferable to link an activation signal to the dwell time, such that for instance an "eye-button" is activated when a certain dwell time is reached. Alternatively, a button, a switch, a speech signal, a movement pattern of an input member, a camera registered gesture pattern or facial expression may constitute the activation signal. Moreover, an eye blink or a predefined EEG-signal may cause the activation signal. However, the latter types of signals are usually relatively difficult for the user to control with a sufficient accuracy.

According to one embodiment of the invention, the event engine 210 is adapted to receive at least one auxiliary input signal Dj, and produce the set of non-cursor controlling event output signals D-HIi on the further basis of this signal. The auxiliary input signal DJ may originate from a button, a switch, a speech signal, a movement pattern of an input member, a camera registered gesture pattern or a facial expression, or an EEG-signal.

Thereby, based on combinations of the eye-tracking data signal $D_{EYE}$ and one or more auxiliary input signals Dj composite user commands may be created, which are very intuitive and easy to learn. Hence, a highly efficient man-machine interaction with the computer apparatus 130 may be accomplished. For instance, watching an eye-button for the document and uttering the control word "open" can open a text document. If a more complex speech recognition is available, an Internet search may be effected by focusing the gaze towards a relevant text input box while uttering the desired search terms, and so on.

According to one embodiment of the invention, at least one GUI-component 220a, . . . , 220n is adapted to interpret a non-cursor controlling event output signal D-HIi from the event engine 210 as an estimated intention of the user 110. Then, in response to the estimated intention, a user manipulation of the component 220a, . . . , 220n is triggered. Preferably, the event engine 210 estimates a user intention based on multiple input sources received as auxiliary input signals Dj, which may include a keyboard signal, a mouse signal, voice data and camera images. However, naturally, the eye-tracking data signal $D_{EYE}$ may also constitute a basis for the estimated user intention. For example, important information can be drawn from different gaze patterns and fixation times.

According to another embodiment of the invention, at least one GUI-component 220a, . . . , 220n is adapted to interpret a non-cursor controlling event output signal D-HIi from the event engine 210 as an estimated attention level of the user 110. Correspondingly, a user manipulation of the component 220a, . . . , 220n is triggered in response to the estimated attention level. Also the attention level may be estimated based on the auxiliary input signals Dj, for instance originating from the keyboard, the mouse, voice data and camera images, and the eye-tracking data signal $D_{EYE}$. Particularly, gaze patterns, fixation points and fixation times constitute an important basis for determining the user's 110 attention level. Preferably, the GUI-components 220a, . . . , 220n vary their behavior depending on the estimated attention level, such that the components' characteristics match the user's 110 current performance.

Furthermore, according to one embodiment of the invention, at least one GUI-component 220a, . . . , 220n is adapted to interpret a non-cursor controlling event output signal D-HIi from the event engine 210 as a state-of-mind parameter of the user 110. The state-of-mind parameter reflects a general user 110 status, for example whether he/she appears to be focused/concentrated, distracted, tired/unfocused or confused. For example, the state-of-mind parameter may indicate an approximated 20% degree of tiredness and an approximated 50% degree of attention. Then, based on the estimated state-of-mind, a user manipulation of the component 220a, . . . , 220n is triggered. Typically, the number of and the contents of any help menus and pop-up windows may be adapted in response to the estimated state-of-mind. However, in operator environments, such as radar watch stations where the attention level as well as the state-of-mind may be truly critical, the security may be improved by pointing out targets etc. that the operator has not yet observed.

According to one embodiment of the invention, the event engine 210 is associated with a template library 230, which contains generic GUI-components, such as eye-buttons, scroll bars, multiview toolbars (see below with reference to FIG. 4), text input fields (see below with reference to FIG. 5), expandable text input fields (see below with reference to FIG. 6) and scroll windows (see below with reference to FIG. 7). Thereby, by means of the template library 230, a software designer may conveniently create functions and controls which can be manipulated based on a user's ocular activity in respect of a display. Of course, after completing the design of a particular eye-controllable application, however, the template library 230 has no actual function in respect of the GUI-components that may originate from its generic components. Nevertheless, the template library 230 may again become useful in case of a future upgrade or a redesign of the application.

According to the invention, it is not technically necessary that any GUI-component manipulations be graphically confirmed on the display. However, this is generally preferable from a user-friendliness point-of-view. FIG. 3a shows a schematic symbol 310, which represents an eye-controllable GUI-component on a display that is set in a non-observed mode (i.e. the eye-tracking data signal $D_{EYE}$ indicates that the user's point of regard lies outside the symbol 310). FIG. 3b shows the symbol 310 in an observed mode, which is set when the eye-tracking data signal $D_{EYE}$ indicates that the user's point of regard falls within the display area represented by the symbol 310. In the observed mode, the symbol 310 contains a centrally located object 311. This object 311 confirms to the user that the computer apparatus has registered that his/her gaze presently is directed towards the symbol 310. Thus, any manipulations in respect of the GUI-component associated with the symbol 310 can be performed. An important advantage attained by means of the centrally located object 311 is that this object assists the user in focusing his/her gaze to the center of the symbol 310. Thereby, a more reliable eye-tracking function is accomplished, and for a given eye-tracker, the symbols 310 can be made smaller than otherwise. Of course, the symbol 310 and the centrally located object 311 may have any other outline than the square representation of FIGS. 3a and 3b. Moreover, to further improve the visual cueing, the object 311 may be animated and or have a particularly interesting color or shape.

FIG. 4 illustrates a first embodiment according to the invention, where a proposed multiview toolbar 401 is used to control applications in a frame 400. The multiview toolbar 401 here includes four different eye-buttons, which each may contain a thumbnail image (not shown) of a respective application with which the button is associated. A first button 410 is associated with a first application, e.g. an Internet browser, which preferably accesses a predefined URL or web page. The first application has a user interface which here is represented by a sub-frame 420 within the frame 400. Hence, by viewing the first button 410, the user may open the sub-frame 420. Either this activation is accomplished after a particular gaze dwell time in respect of the button 410, or in response to an activation signal, for example a keystroke or a control word. Then, a search may be executed by viewing a text input box 411, entering relevant search terms, and thereafter manipulating a search button 412 (preferably also based on the eye-tracking data signal).

FIG. 5 illustrates a second embodiment according to the invention based on the proposed multiview toolbar 401. Here, a second button 510 is associated with a second application, e.g. a product management system, which has a user interface in the form of a sub-frame 520 within the frame 400. This means that a user may activate the second application by viewing the second button 510 during a particular gaze dwell time, or generating a separate activation signal (as mentioned above). Preferably, a default set of text input boxes and buttons 515 are activated initially. Then, by viewing other areas within the sub-frame 520, alternative fields and functions may be activated and manipulated.

Particularly, a screen control may be adapted to expand upon a manipulation based on a user's ocular activity. FIGS. 6a and 6b illustrate this as a third embodiment according to the invention.

Here, a text field 620 in the sub-frame 520 occupies a relatively small area on the display as long as the eye-tracking data signal indicates that the user's point of regard lies outside this field 620. However if, according to the eye-tracking data signal, the point of regard reaches a particular dwell time within the display area represented by the text field 620, this field expands, for instance as shown in the FIG. 6b. Hence, more information than what was initially visible in the field 620 may be shown. The thus expanded text field 620 may even cover graphical objects which otherwise are shown in the frame 400. This is advantageous, because thereby the information may be presented on-demand, so that the frame 400 and the sub-frame 520 contain more data than what actually can be fitted therein. For instance, a text scrolling, which otherwise would have been necessary can be avoided.

FIG. 7 illustrates a fourth embodiment according to the invention, which realizes a scrolling function based on a user's ocular activity. Here, a third application, e.g. a map viewer, is associated with a third button 710. Thus, by watching the third button 710, and activating its associated GUI-component, either based on a gaze dwell time or by means of a separate activation signal, the computer apparatus opens up a map sub-frame 720 within the frame 400. This sub-frame, in turn, presents a digitized map. It is here presumed that the map is larger than the available presentation area in the map sub-frame 720, so that only a part of the map can be presented at the same time.

A scrolling with respect to the map is achieved based on the user's point or regard. Preferably, no scrolling occurs as long as the eye-tracking data signal indicates that the point of regard lies within a central area delimited by a first dashed line a, a second dashed line b, a third dashed line c and a fourth dashed line d, neither of which preferably are visible on the display. If however, the user's point of regard is placed outside any of the lines a, b, c or d, the map scrolls in a particular direction given by the point of regard. Specifically, this means that a point of regard below the line c results in a downward scroll along the arrow S; a point of regard above the line d results in a upward scroll along the arrow N; a point of regard to the right of the line b results in a rightward scroll along the arrow E; and a point of regard to the left of the line a results in a leftward scroll along the arrow W. Moreover, a point of regard, which lies below the line c and to the right of the line b results in a diagonal scroll along the arrow SE; a point of regard, which lies above the line d and to the right of the line b results in a diagonal scroll along the arrow NE; a point of regard, which lies above the line d and to the left of the line a results in a diagonal scroll along the arrow NW; and a point of regard, which lies below the line c and to the left of the line a results in a diagonal scroll along the arrow SW. This scroll function may either be activated based on a dwell time, or a separate activation signal may be required, such as a clicking a key/button or holding down a key/button.

Furthermore, the scroll speed may depend on the distance between the point of regard and the respective lines a, b, c and d, such that a relatively long distance corresponds to a comparatively high speed, and vice versa. The scroll speed may also depend on the scroll time, and/or a length of the latest saccades registered in the eye-tracking data signal.

Preferably, a maximum scroll speed is set to such a value that the scrolled information is visible to the user at all possible speeds.

According to one embodiment of the invention, the scroll function is stopped by pressing a key/button, releasing a key/button, the length of the latest saccades exceeding a particular value, the point of regard moving outside the map sub-frame 720, the point of regard moving towards the center of the map sub-frame 720, or towards an opposite scroll activation line a, b, c, or d.

It should be noted that, eyetrack-driven scrolling solutions as such are described in the prior art, for instance in the document U.S. Pat. No. 5,850,221. Here, a page oriented or continuous information scrolling function is initiated or controlled based on where a viewer's eyes are looking.

Figure 8:
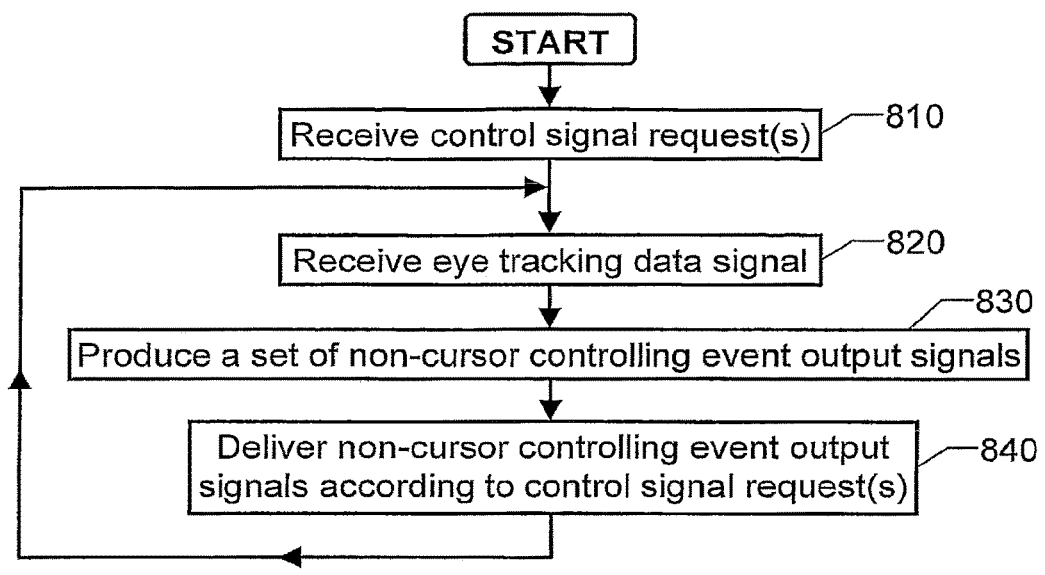
FIG. 8 illustrates, by means of a flow diagram, a general method of controlling a computer apparatus according to the invention.

To sum up, the general method of controlling a computer apparatus according to the invention will now be described with reference to the flow diagram in FIG. 8.

An initial step 810 receives a control signal request from each of at least one GUI-component, which is adapted to be manipulated based on user-generated eye commands. The control signal request defines a sub-set of the set of non-cursor controlling event output signals, which is required by the particular GUI-component in order to operate as intended.

A step 820 then receives an eye-tracking data signal, which describes a user's point of regard on a display associated with a computer that embodies the at least one GUI-component. Subsequently, a step 830 produces a set of non-cursor controlling event output signals based on the eye-tracking data signal, plus any auxiliary input signal.

Subsequently, a step 840 delivers the non-cursor controlling event output signals to the at least one GUI-component so that a relevant influence thereof may occur (i.e. according to each respective control signal request). It is presumed that each non-cursor controlling event output signal describes a particular aspect of the user's ocular activity in respect of the display. Thus, the non-cursor controlling event output signals express user-generated eye commands. After the step 840, the procedure loops back to the step 820 for receiving an updated eye tracking data signal.

All of the process steps, as well as any sub-sequence of steps, described with reference to the FIG. 8 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A computer apparatus associated with a display, wherein the computer apparatus comprises a hardware implementation or a non-transitory computer-readable medium storing executable instructions, and the display is configured to display at least one GUI-component, the computer apparatus comprising:
   an event engine comprising a library of GUI-components, including a text input field, capable of being manipulated by eye-tracking data indicating a user's point of regard on the display, wherein the event engine is configured to:
   provide the text input field of the library of GUI-components to an application on the computer apparatus,
   receive a control signal request from the application which is displaying the text input field, the control signal request defining at least one non-cursor controlling event output signal which is required by the application to operate the text input field as intended,
   produce the at least one non-cursor controlling event output signal which is requested by the control signal request, in response to at least the user's point of regard on the display,
   send the at least one non-cursor controlling event output signal to the application in accordance with the control signal request, and
   wherein the at least one non-cursor controlling event output signal is configured to manipulate the text input field such that upon the user's point of regard being within bounds of the text input field for a predetermined period of time, the at least one non-cursor controlling event output signal causes the text input field to expand such that more information than was initially visible in the text input field is displayed.

2. The computer apparatus according to claim 1, wherein the library of the GUI-components comprises at least one of:
   an eye-button,
   a scroll-bar,
   a multiview toolbar,
   an expandable text input field, or
   a scroll window.

3. The computer apparatus according to claim 2, wherein the multiview toolbar comprises at least one eye-button.

4. The computer apparatus according to claim 3, wherein at least one eye-button comprises a thumbnail image of an application to which the at least one eye-button is associated.

5. The computer apparatus according to claim 1, wherein the text input field, once expanded, covers graphical objects otherwise shown on the display.

6. A method for controlling a computer apparatus associated with a display, the display displaying at least one GUI-component, the method comprising:
  providing, by an event engine, a library of GUI-components, including a text input field, capable of being manipulated by eye-tracking data indicating a user's point of regard on the display,
  providing, by the event engine, the text input field of the library of GUI-components to an application on the computer apparatus,
  receiving, by the event engine, a control signal request from the application which is displaying the text input field, the control signal request defining at least one non-cursor controlling event output signal which is required by the application to operate the text input field as intended,
  producing, by the event engine, the at least one non-cursor controlling event output signal which is requested by the control signal request, in response to at least the user's point of regard on the display,
  sending, by the event engine, the at least one non-cursor controlling event output signal to the application in accordance with the control signal request, and
  wherein the at least one non-cursor controlling event output signal is configured to manipulate the text input field such that upon the user's point of regard being within bounds of the text input field for a predetermined period of time, the at least one non-cursor controlling event output signal causes the text input field to expand such that more information than was initially visible in the text input field is displayed.

7. The method according to claim 6, wherein the library comprises at least one of:
  an eye-button,
  a scroll-bar,
  a multiview toolbar,
  an expandable text input field, or
  a scroll window.

8. The method according to claim 7, wherein the multiview toolbar comprises at least one eye-button.

9. The method according to claim 8, wherein the at least one eye-button comprises a thumbnail image of an application to which the at least one eye-button is associated.

10. The method according to claim 6, wherein the text input field, once expanded, covers graphical objects otherwise shown on the display.

11. A non-transitory computer readable medium containing a computer program product for controlling a computer apparatus associated with a display, the display displaying at least one GUI-component, the computer program product comprising computer-executable instructions for:
  providing, by an event engine, a library of GUI-components, including a text input field, capable of being manipulated by eye-tracking data indicating a user's point of regard on the display,
  providing, by the event engine, the text input field of the library of GUI-components to an application on the computer apparatus,
  receiving, by the event engine, a control signal request from the application which is displaying the text input field, the control signal request defining at least one non-cursor controlling event output signal which is required by the application to operate the text input field as intended,
  producing, by the event engine, the at least one non-cursor controlling event output signal which is requested by the control signal request, in response to at least the user's point of regard on the display,
  sending, by the event engine, the at least one non-cursor controlling event output signal to the application in accordance with the control signal request, and
  wherein the at least one non-cursor controlling event output signal is configured to manipulate the text input field such that upon the user's point of regard being within bounds of the text input field for a predetermined period of time, the at least one non-cursor controlling event output signal causes the text input field to expand such that more information than was initially visible in the text input field is displayed.

12. The non-transitory computer readable medium according to claim 11, wherein the library comprises at least one of:
  an eye-button,
  a scroll-bar,
  a multiview toolbar,
  an expandable text input field, or
  a scroll window.

13. The non-transitory computer readable medium according to claim 12, wherein the multiview toolbar comprises at least one eye-button.

14. The non-transitory computer readable medium according to claim 13, wherein the at least one eye-button comprises a thumbnail image of an application to which the at least one eye-button is associated.

15. The non-transitory computer readable medium according to claim 11, wherein the text input field, once expanded, covers graphical objects otherwise shown on the display.

16. The computer apparatus according to claim 1, wherein the library of GUI-components further includes a scroll window, and
  wherein the scroll window is:
    configured to present an object larger than the available presentation area of the scroll window,
    capable of being manipulated by the eye-tracking data indicating the user's point of regard on the display, and
    configured to, if the point of regard lies in a portion of the scroll window presenting a portion of the object, but outside a central portion of the scroll window, to scroll the object in a particular direction given by the point of regard.

17. The computer apparatus according to claim 1, wherein the computer apparatus further comprises the display, and the display is further configured to:
  display a plurality of GUI-components of the library of GUI-components, including at least one text input field represented in a first form based on the eye-tracking data, in a display area; and
  display the text input field represented in a second form in the display area, wherein the second form is transformed from the first form based on the eye-tracking data;
  wherein the text input field represented in the second form covers at least one of the plurality of GUI-components other than the text input filed.

* * * * *